(12) United States Patent
Damron (10) Patent No.: US 6,675,372 B1
(45) Date of Patent: Jan. 6, 2004

(54) COUNTING SPECULATIVE AND NON-SPECULATIVE EVENTS

(75) Inventor: Peter C. Damron, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 574 days.

(21) Appl. No.: 09/703,398

(22) Filed: Oct. 31, 2000

(51) Int. Cl.[7] ................................. G06F 11/34
(52) U.S. Cl. ...................................... 717/130
(58) Field of Search ................. 717/127, 130

(56) References Cited

U.S. PATENT DOCUMENTS

| | | | |
|---|---|---|---|
| 5,107,418 A | 4/1992 | Cramer et al. | 395/700 |
| 5,136,705 A | 8/1992 | Stubbs et al. | 395/575 |
| 5,317,740 A | 5/1994 | Sites | 395/700 |
| 5,367,685 A | 11/1994 | Gosling | 395/700 |
| 5,493,675 A | 2/1996 | Faiman, Jr. et al. | 395/700 |
| 5,659,754 A | 8/1997 | Grove et al. | 395/709 |
| 5,778,233 A | 7/1998 | Besaw et al. | 395/709 |
| 5,790,859 A | 8/1998 | Sarkar | 395/704 |
| 5,822,788 A | 10/1998 | Kahn et al. | 711/213 |
| 6,549,930 B1 * | 4/2003 | Chrysos et al. | 709/104 |

FOREIGN PATENT DOCUMENTS

EP 1 063 585 12/2000

OTHER PUBLICATIONS

Zagha et al., "Performance Analysis Using the MIPS R10000 Performance Counters", Proceedings of the AMC/IEEE Conference on Supercomputing, ACM, Nov. 1996, 20 pages.*

Dean et al., "ProfileMe: Hardware Support for Instruction-Level Profiling on Out-of-Order Processors", Proceedings of the 30th Annual ACM/IEEE International Symposium on Microarchitecture, ACM, 1997, pp. 292–302.*

* cited by examiner

*Primary Examiner*—William M. Treat
(74) *Attorney, Agent, or Firm*—Thelen Reid & Priest LLP; Marc S. Hanish (57) ABSTRACT

Counting events during the execution of one or more instructions in a computer system may be accomplished by maintaining a non-speculative counter for counting events occurring in non-speculative instructions, as well as a separate speculative counter for counting events occurring in speculative instructions. Event counters may be used to count individual events occurring during the processing of instructions. When the instruction has been completed, the amount in the event counter corresponding to a particular event for that instruction is added to the amount in the speculative counter corresponding to the event. Then, any retirable instructions are retired. Once an instruction is retired, it is no longer speculative, allowing the amount in the speculative counter to be decremented and the amount in the non-speculative counter to be incremented by the amount in any event counters corresponding to retirable instructions. The speculative and non-speculative counters may then be examined at any point in time to give a clear picture of the number of times a specific event has occurred, even when instructions are executed out-of-order.

62 Claims, 5 Drawing Sheets

COUNTING SPECULATIVE AND NON-SPECULATIVE EVENTS

BACKGROUND OF THE INVENTION

1. Field of the Invention

The present invention relates to the field of computer systems. More specifically, the present invention relates to counting speculative and non-speculative events in a computer system.

2. The Background

Events of various types are normally counted in a computer system in order to assess the performance of the computer system. These events are generally carefully tracked, and then analyzed after a program has completed running.

Figure 1:
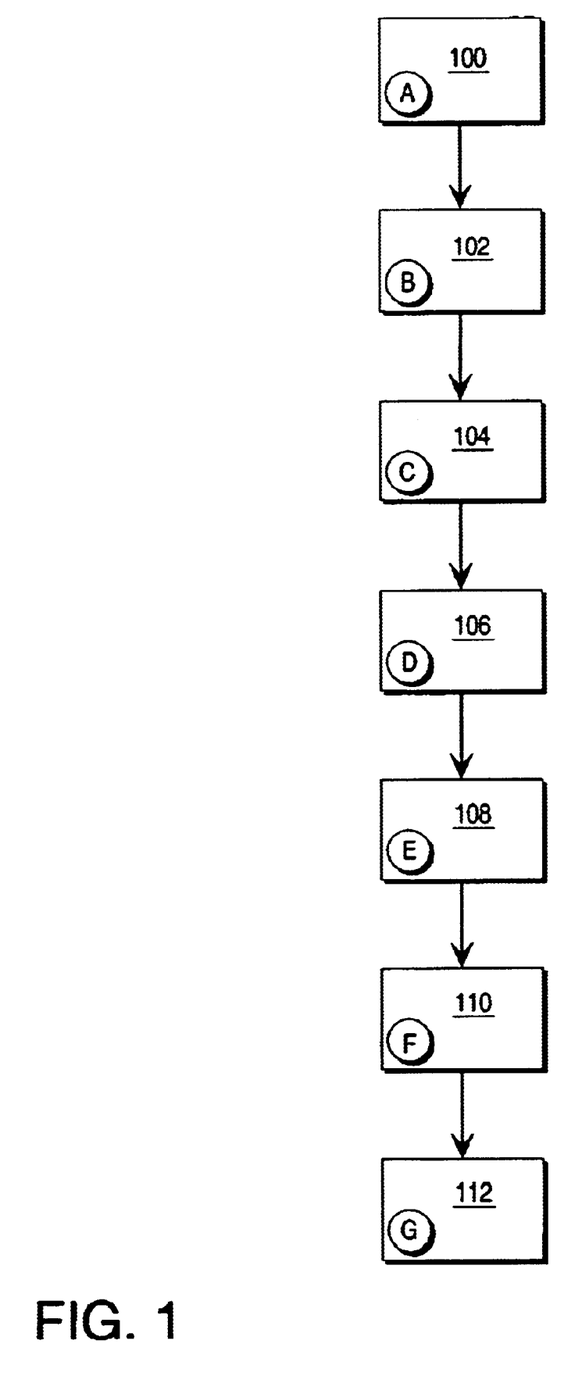
FIG. 1 is a diagram illustrating the flow of a typical computer program.

However, modern scheduling in hardware and software can make tracking events more difficult. FIG. 1 is a diagram illustrating the flow of a typical computer program. The program may be split into seven blocks A 100, B 102, C 104, D 106, E 108, F 110, G 112. Normally, without special scheduling, the flow would proceed in the order depicted.

Figure 2:
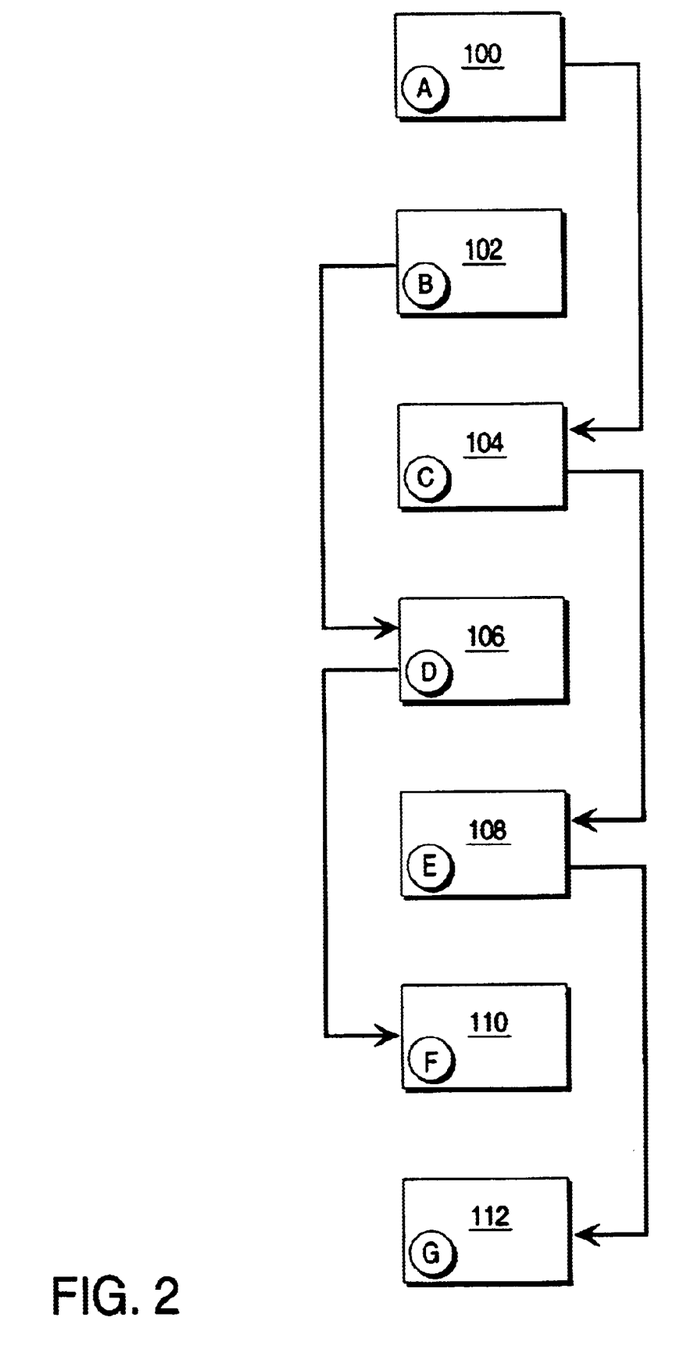
FIG. 2 is a diagram illustrating a dependency graph for the computer program of FIG. 1.

FIG. 2, however, is a diagram illustrating a dependency graph for the computer program of FIG. 1. A first block may be dependent upon a second block if the first block must be executed after the second block (for example, if the second block computes a variable that is used in the first block). As can be seen in FIG. 2, the dependencies between the blocks are irrespective of the original ordering of the blocks. Therefore, in the present example, it is possible to reschedule the blocks such that they are performed out-of-order.

Figure 3:
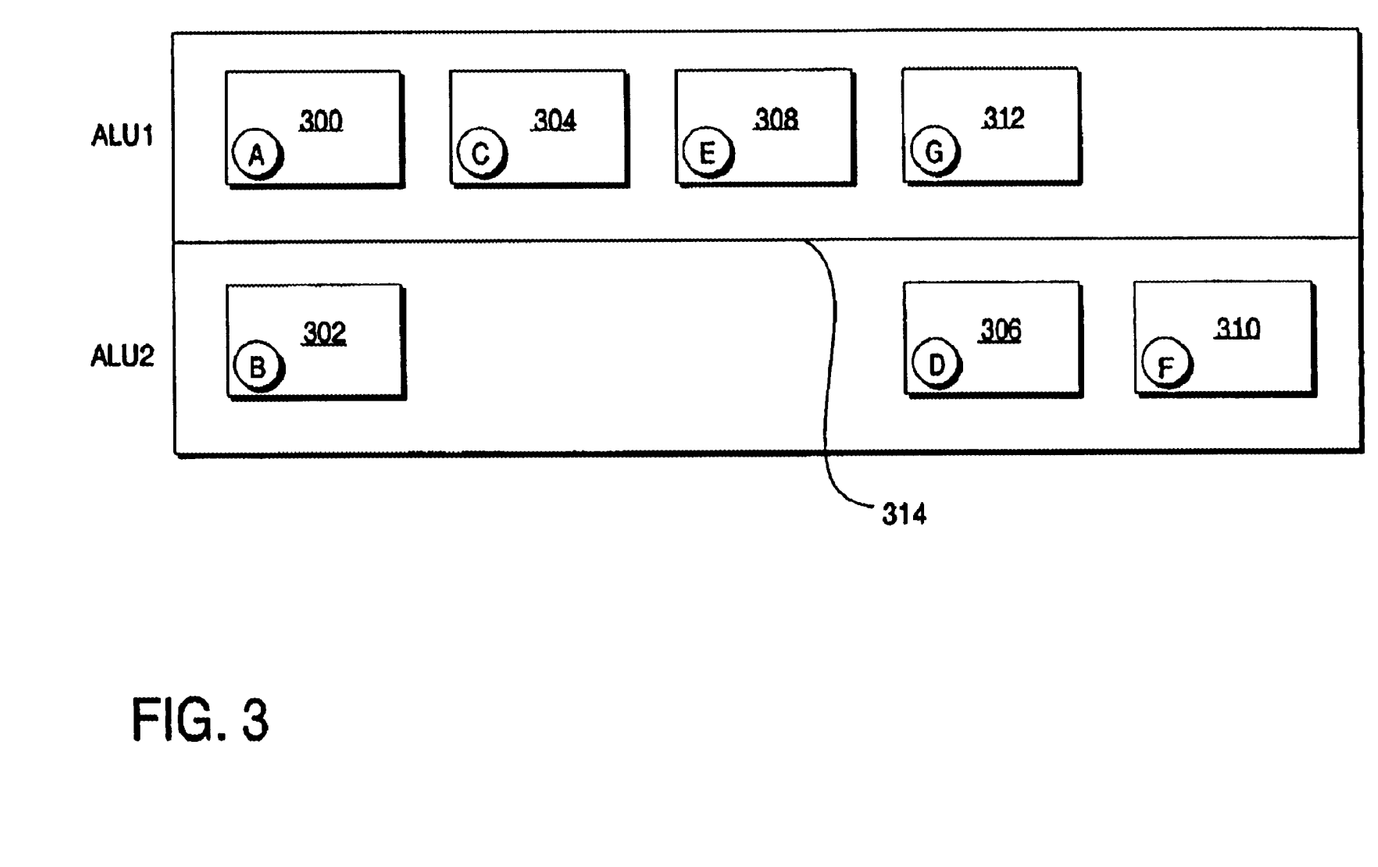
FIG. 3 is a diagram illustrating an example of the scheduling of the blocks of FIG. 2 in a system with dual arithmetic logic units (ALUs).

FIG. 3 is a diagram illustrating an example of the scheduling of the blocks of FIG. 2 in a system with dual arithmetic logic units (ALUs). Blocks A 300, C 304, E 308, and G 312 are scheduled in the first ALU, while Blocks B 302, D 306, and F 310 are scheduled in the second ALU. The blocks are scheduled based on how long each block takes to complete execution. Thus, Block B 302 may take a significant amount of time to execute whereas block A 300 may take a relatively minimal amount of time to execute. This may lead, however, to problems in counting events.

If an event count is examined at a time t 314, block D 306 has not yet executed but block E 308 has. This is known as out-of-order execution. The problem is that event counts examined during this period when the blocks have been executed out of order are no longer reliable. For example, an event may occur in block D 306 but not in block E 308. When measuring the event count after execution of block E 308, the count will reflect that the event has not yet occurred. Yet, one who examined the software code in-order would have expected the event to have occurred by the time block E 308 has been executed.

What is needed is a solution which provides accurate event counts on out-of-order blocks or instructions.

SUMMARY OF THE INVENTION

Counting events during the execution of one or more instructions in a computer system may be accomplished by maintaining a non-speculative counter for counting events occurring in non-speculative instructions, as well as a separate speculative counter for counting events occurring in speculative instructions. Event counters may be used to count individual events occurring during the processing of instructions. When the instruction has been completed, the amount in the event counter corresponding to a particular event for that instruction is added to the amount in the speculative counter corresponding to the event. Then, any retirable instructions are retired. Once an instruction is retired, it is no longer speculative, allowing the amount in the speculative counter to be decremented and the amount in the non-speculative counter to be incremented by the amount in any event counters corresponding to retirable instructions. The speculative and non-speculative counters may then be examined at any point in time to give a clear picture of the number of times a specific event has occurred, even when instructions are executed out-of-order.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using a combination of hardware and software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Events occurring in a first block, where the first block has been executed out of order, may be referred to as speculative events until such time as any blocks or instructions initially intended to be executed before the first block are, in fact, executed. At that point, the events become nonspeculative. Thus, an event that is non-speculative will be accurately represented in an event count, but a speculative one will not. The present invention provides for the tracking of both nonspeculative and speculative events in order to accurately reflect event counts at any point in time, not just when they become nonspeculative.

In a specific embodiment of the present invention, two separate counters are maintained. The first is a non-speculative event counter. The second is a speculative event counter. A foreseeable implementation of the present invention would include two counters such as these for each and every event to be measured. For example, there may be an event counter and speculative event counter for the number of instructions executed, and a separate event counter and speculative event counter for the number of floating point operations performed. As will be discussed later, however, an implementation is also possible where the tracking of many different events may be performed with a relatively small number of pairs of counters.

In addition to these two counters, each block or instruction has an event counter. If the event being measured is simply instructions or blocks completed, the event counter may simply be a bit that is switched from 0 to 1 when the instruction or block has finished processing. For other events that may occur more than once during the execution of the block or instruction, a larger counter will be required. When an event occurs in a block, the block's event counter is incremented.

After a block has executed, the speculative counter is incremented by the amount in the eventcounter. Then the process may check to see if the block may be retired. A block may be retired (also known as committed) once every block before it in the original ordering of the program has been executed. Thus, a block that was originally sixth in a series of ten blocks may be retired only when the five blocks before it have been retired.

If the block can be retired, then the speculative counter is decremented by the amount in the block's event counter and the non-speculative counter is incremented by the amount in the event counter. If it cannot be retired, the process simply moves onto to execution of the next block. At the completion of each block, the process not only checks to see if the just-completed block can be retired, but also every other unretired block. Thus, if a block cannot be retired upon its completion, but can be retired at a later point in time, at the later point in time the speculative counter may be decremented by the amount in the retiring block's event counter and the non-speculative counter may be incremented by the amount in the event counter. Alternatively, the speculative counter may be incremented simultaneously with the block's event counter.

This allows the system to then be examined at any point in time and still get an accurate event count. Additionally, tracking both counters separately allows the system to be examined for either the actual event count (every event that has executed, as evidenced by the total of both the non-speculative event counter and the speculative event counter) or the event count only for retired blocks (every event that has executed in block that are now non-speculative, as evidenced by only the total in the non-speculative event counter).

A specific implementation of the present invention may be used for tracking the final state necessary for floating point arithmetic accrued exceptions (e.g. IEEE standard 754-1985) in the presence of speculated instruction execution. These are certain exceptions that may happen during the course of floating point operations, such as a "divide by 0", invalid, overflow, underflow, and inexact. Other implementations may track different events, such as cache misses or total instructions executed.

As discussed earlier, when designing a system to track multiple events, an implementation is possible where memory space may be saved. For example, normally a system designed to track 100 different events would require 100 speculative counters and 100 non-speculative counters. However, it is unlikely that all 100 events will need to be tracked simultaneously. Therefore, rather than provide separate speculative/nonspeculative counter pairs for all 100 events, it may be more efficient to provide counter pairs only for the maximum number of events that foreseeably would be tracked simultaneously. For example, if one foresees only tracking at most 8 simultaneous events, 8 counter pairs may be provided and the precise event being tracked may be specified by using a gate to indicate the correct event for each pair.

Figure 4:
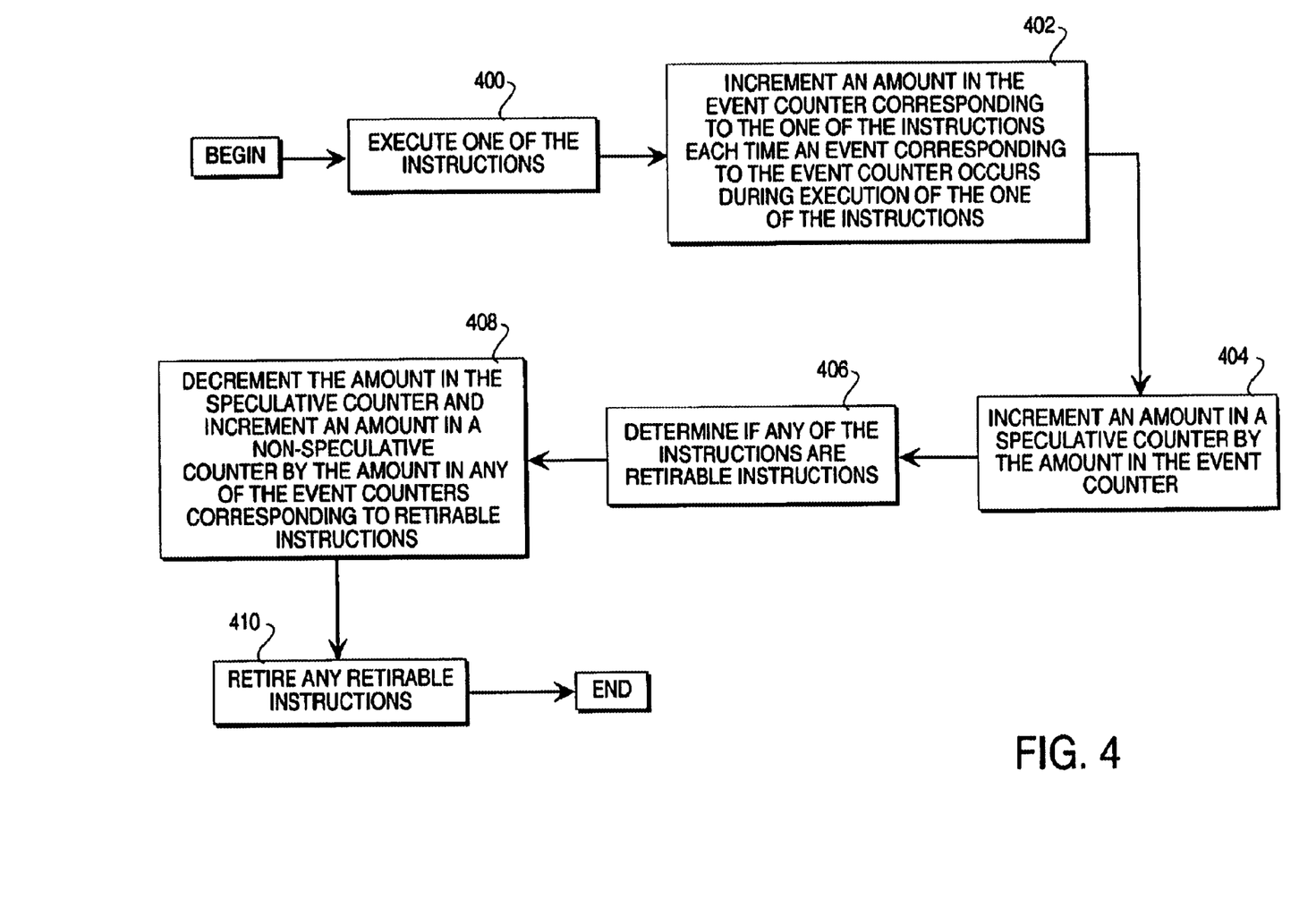
FIG. 4 is a flow diagram illustrating a method for counting events in a computer system, wherein the computer system contains an event counter for each event to be counted for each of the instructions, in accordance with a specific embodiment of the present invention.

FIG. 4 is a flow diagram illustrating a method for counting events in a computer system, wherein the computer system contains an event counter for each event to be counted for each of the instructions, in accordance with a specific embodiment of the present invention. At 400, one of the instructions is executed. At 402, an amount in the event counter corresponding to the one of the instructions is incremented each time an event corresponding to the event counter occurs during execution of the one of the instructions. At 404, an amount in a speculative counter is incremented by the amount in the event counter. At 406, it is determined if any of the instructions are retirable instructions. This may be accomplished by examining the event counters if the event counters track instructions executed. If not, there is another mechanism for tracking which instructions or blocks have executed. An instruction may be retired if all of the instructions preceding it in the original order have been executed.

The event counter for each instruction is initially set to zero at some point prior to executing that instruction and prior to any event that might be associated with that instruction. The speculative and non-speculative counters would typically be initialized to zero or some other appropriate value by software control, typically at program startup and at other points in the program. The speculative and non-speculative counters would also have their values be readable by software control. In addition, other even counter mechanisms can be easily included into the implementation of the speculative and non-speculative counters, such as a trap-on-overflow capability, where the counters may generate a trap or otherwise interrupt normal execution when they reach a predetermined value.

At 408, the amount in the speculative counter is decremented and the amount in the non-speculative counter is incremented by the amount in any of the event counters corresponding to retirable instructions. At 410, any retirable instructions are retired. This process may then be repeated for each of the instructions.

Figure 5:
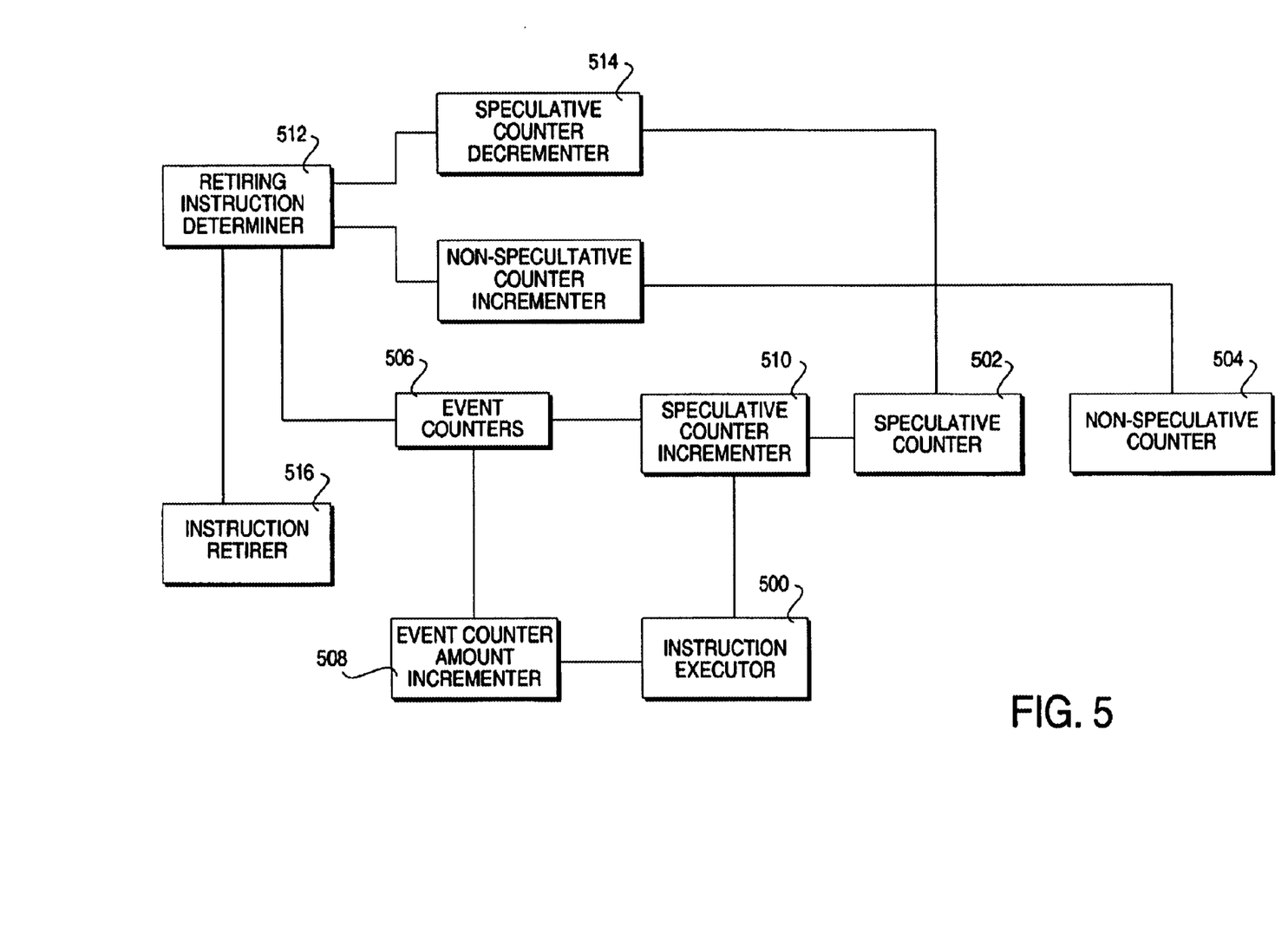
FIG. 5 is a block diagram illustrating an apparatus for counting events in a computer system, wherein the computer system contains an event counter for each event to be counted for each of the instructions, in accordance with a specific embodiment of the present invention.

FIG. 5 is a block diagram illustrating a method for counting events in a computer system, wherein the computer system contains an event counter for each event to be counted for each of the instructions, in accordance with a specific embodiment of the present invention. An instruction executor 500 may execute one of the instructions. A speculative counter 502 and non-speculative counter 504 are provided to hold values. Furthermore, an event counter 506 corresponding to each event to be counted for each of the instructions may be provided. Alternatively, event counters only for each event to be simultaneously counted for each of the instructions may be provided. An event counter amount incrementer 508 coupled to the instruction executor 500 and to each of the counters 506 increments an amount in the event counter corresponding to the one of the instructions each time an event corresponding to the event counter occurs during execution of the one of the instructions. A speculative counter incrementer 510 coupled to the event counters 506, the instruction executor 502, and to the speculative counter 502 increments an amount in the speculative counter 502 by the amount in the event counter. Alternatively, the speculative counter 502 may be incremented by the speculative counter incrementer 510 when the event counters 506 are incremented, before the instruction has finished execution. A retiring instruction determiner 512 coupled to the event counters 506 determines if any of the instructions are retirable instructions. This may be accomplished by examining the event counters if the event counters track instructions executed. If not, there is another mechanism for tracking which instructions or blocks have executed. An instruction may be retired if all of the instructions preceding it in the original order have been executed.

A speculative counter decrementer 514 coupled to the retiring instruction determiner 512 and to the speculative counter 502 may decrement the amount in the speculative counter by the amount in any of the event counters corresponding to retirable instructions. Similarly, a non-speculative counter incrementer 516 coupled to the retiring instruction determiner 512 and to the speculative counter 502 may increment the amount in the non-speculative counter by the amount in any of the event counters corresponding to retirable instructions. An instruction retirer 516 may retire any retirable instructions. This process may then be repeated for each of the instructions.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for counting events during the execution of one or more instructions in a computer system, wherein the computer system contains an event counter for each event to be counted for each of the instructions, the method including:

executing one of the instructions;

incrementing an amount in the event counter corresponding to said one of the instructions each time an event corresponding to said event counter occurs during execution of said one of the instructions;

incrementing an amount in a speculative counter by said amount in said event counter;

determining if any of the instructions are retirable instructions;

decrementing said amount in said speculative counter and incrementing an amount in a non-speculative counter by said amount in any of said event counters corresponding to retirable instructions; and retiring any retirable instructions.

2. The method of claim 1, further including repeating the method for each of the instructions.

3. The method of claim 1, wherein the instructions have an original order and an instruction is retirable if all instructions falling before it in said original order have been executed.

4. The method of claim 1, wherein the event counters are each a single bit wide.

5. The method of claim 1, wherein the event counters measure number of instructions executed.

6. The method of claim 1, wherein the event counters measure cache misses.

7. The method of claim 1, wherein the event counters measure number of floating point operations performed.

8. The method of claim 1, wherein the event counters measure number of floating point accrued exceptions.

9. The method of claim 8, wherein said floating point accrued exceptions include invalid, overflow, underflow, division-by-zero, and inexact.

10. The method of claim 1, wherein said amount in said speculative counter and said amount in said non-speculative counter are readable with software instructions exectuable at any point in said execution.

11. The method of claim 1, wherein said amount in said speculative counter and said amount in said non-speculative counter are writeable with software instructions executable at any point in said execution.

12. The method of claim 1, wherein said speculative counter may generate a trap or otherwise interrupt normal execution when it reaches a predetermined value.

13. The method of claim 1, wherein said non-speculative counter may generate a trap or otherwise interrupt normal execution when it reaches a predetermined value.

14. A method for counting events during the execution of one or more instructions in a computer system, wherein the computer system contains an event counter for each event to be simultaneously counted for each of the instructions, the method including:

executing one of the instructions;

incrementing an amount in the event counter corresponding to said one of the instructions each time an event corresponding to said event counter occurs during execution of said one of the instructions;

incrementing an amount in a speculative counter by said amount in said event counter;

determining if any of the instructions are retirable instructions;

decrementing said amount in said speculative counter and incrementing an amount in a non-speculative counter by said amount in any of said event counters corresponding to retirable instructions; and retiring any retirable instructions.

15. The method of claim 14, further including repeating the method for each of the instructions.

16. The method of claim 14, wherein the instructions have an original order and an instruction is retirable if all instructions falling before it in said original order have been executed.

17. The method of claim 14, wherein the event counters measure number of instructions executed and are each a single bit wide.

18. The method of claim 14, wherein the event counters measure number of floating point operations performed.

19. The method of claim 14, wherein the event counters measure cache misses.

20. The method of claim 14, wherein the event counters measure number of floating point accrued exceptions.

21. The method of claim 20, wherein said floating point accrued exceptions include invalid, overflow, underflow, division-by-zero, and inexact.

22. The method of claim 14, wherein said amount in said speculative counter and said amount in said non-speculative counter are readable with software instructions exectuable at any point in said execution.

23. The method of claim 14, wherein said amount in said speculative counter and said amount in said non-speculative counter are writeable with software instructions executable at any point in said execution.

24. The method of claim 14, wherein said speculative counter may generate a trap or otherwise interrupt normal execution when it reaches a predetermined value.

25. The method of claim 14, wherein said non-speculative counter may generate a trap or otherwise interrupt normal execution when it reaches a predetermined value.

26. The method of claim 14, wherein the event counters for each event to be simultaneously counted are coupled via a gate and the method further includes selecting a state for said gate to indicate which events are currently being measured.

27. A method for counting events during the execution of one or more blocks in a computer system, wherein the computer system contains an event counter for each event to be counted in each of the blocks, the method including:
   executing one of the blocks;
   incrementing an amount in the event counter corresponding to said one of the blocks each time an event corresponding to said event counter occurs during execution of said one of the blocks;
   incrementing an amount in a speculative counter by said amount in said event counter when said execution of said one of the blocks is completed;
   determining if any of the blocks are retirable instructions;
   decrementing said amount in said speculative counter and incrementing an amount in a non-speculative counter by said amount in any of said event counters corresponding to retirable blocks; and
   retiring any retirable blocks.

28. The method of claim 27, further including repeating the method for each of the blocks.

29. The method of claim 27, wherein the blocks have an original order and an block is retirable if all blocks falling before it in said original order have been executed.

30. The method of claim 27, wherein the event counters measure number of blocks executed and are each a single bit wide.

31. The method of claim 27, wherein the event counters measure number of floating point operations performed.

32. The method of claim 27, wherein the event counters measure cache misses.

33. The method of claim 27, wherein the event counters measure number of floating point accrued exceptions.

34. The method of claim 33, wherein said floating point accrued exceptions include invalid, overflow, underflow, division-by-zero, and inexact.

35. The method of claim 27, wherein said amount in said speculative counter and said amount in said non-speculative counter are readable with software instructions exectuable at any point in said execution.

36. The method of claim 27, wherein said amount in said speculative counter and said amount in said non-speculative counter are writeable with software instructions executable at any point in said execution.

37. The method of claim 27, wherein said speculative counter may generate a trap or otherwise interrupt normal execution when it reaches a predetermined value.

38. The method of claim 27, wherein said non-speculative counter may generate a trap or otherwise interrupt normal execution when it reaches a predetermined value.

39. A method for counting events during the execution of one or more blocks in a computer system, wherein the computer system contains an event counter for each event to be simultaneously counted in each of the blocks, the method including:
   executing one of the blocks;
   incrementing an amount in the event counter corresponding to said one of the blocks each time an event corresponding to said event counter occurs during execution of said one of the blocks;
   incrementing an amount in a speculative counter by said amount in said event counter when said execution of said one of the blocks is completed;
   determining if any of the blocks are retirable instructions;
   decrementing said amount in said speculative counter and incrementing an amount in a non-speculative counter by said amount in any of said event counters corresponding to retirable blocks; and
   retiring any retirable blocks.

40. The method of claim 39, further including repeating the method for each of the blocks.

41. The method of claim 39, wherein the blocks have an original order and an block is retirable if all blocks falling before it in said original order have been executed.

42. The method of claim 39, wherein the event counters measure number of blocks executed and are each a single bit wide.

43. The method of claim 39, wherein the event counters measure number of floating point operations performed.

44. The method of claim 39, wherein the event counters measure cache misses.

45. The method of claim 39, wherein the event counters measure number of floating point accrued exceptions.

46. The method of claim 45, wherein said floating point accrued exceptions include invalid, overflow, underflow, division-by-zero, and inexact.

47. The method of claim 39, wherein said amount in said speculative counter and said amount in said non-speculative counter are readable with software instructions exectuable at any point in said execution.

48. The method of claim 39, wherein said amount in said speculative counter and said amount in said non-speculative counter are writeable with software instructions executable at any point in said execution.

49. The method of claim 39, wherein said speculative counter may generate a trap or otherwise interrupt normal execution when it reaches a predetermined value.

50. The method of claim 39, wherein said non-speculative counter may generate a trap or otherwise interrupt normal execution when it reaches a predetermined value.

51. The method of claim 39, wherein the event counters for each event to be simultaneously counted are coupled via a gate and the method further includes selecting a state for said gate to indicate which events are currently being measured.

52. An apparatus for counting events during the execution of one or more instructions in a computer system including:
   an event counter corresponding to each event to be counted for each of the instructions;
   a speculative counter;
   a non-speculative counter;
   an instruction executer;
   an event counter amount incrementer coupled to said instruction executor and each of said event counters;
   a speculative counter incrementer coupled to each of said event counters, to said instruction executor, and to said speculative counter;
   a retiring instruction determiner coupled to each of said event counters;
   a speculative counter decrementer coupled to said retiring instruction determiner, to each of said event counters, and to said speculative counter;

a non-speculative counter incrementer coupled to said retiring instruction determiner, to each of said event counters, and to said non-speculative counter; and an instruction retirer coupled to said retiring instruction determiner.

53. The apparatus of claim 52, wherein said event counters measure number of instructions executed and are each a single bit wide.

54. The apparatus of claim 52, wherein said event counters measure number of floating point operations performed.

55. The apparatus of claim 52, wherein said event counters measure cache misses.

56. An apparatus for counting events during the execution of one or more instructions in a computer system including:

an event counter corresponding to each event to be simultaneously counted for each of the instructions;

a speculative counter;

a non-speculative counter;

an instruction executer;

an event counter amount incrementer coupled to said instruction executor and each of said event counters;

a speculative counter incrementer coupled to each of said event counters, to said instruction executor, and to said speculative counter;

a retiring instruction determiner coupled to each of said event counters;

a speculative counter decrementer coupled to said retiring instruction determiner, to each of said event counters, and to said speculative counter;

a non-speculative counter incrementer coupled to said retiring instruction determiner, to each of said event counters, and to said non-speculative counter; and an instruction retirer coupled to said retiring instruction determiner.

57. The apparatus of claim 56, wherein said event counters measure number of instructions executed and are each a single bit wide.

58. The apparatus of claim 56, wherein said event counters measure number of floating point operations performed.

59. The apparatus of claim 56, wherein said event counters measure cache misses.

60. The apparatus of claim 56, further including a currently measured event selecting gate coupled to each of said event counters.

61. A program storage device readable by a machine, tangibly embodying a program of instructions executable by the machine to perform a method for counting events during the execution of one or more instructions in a computer system, wherein the computer system contains an event counter for each event to be counted for each of the instructions, the method including:

executing one of the instructions;

incrementing an amount in the event counter corresponding to said one of the instructions each time an event corresponding to said event counter occurs during execution of said one of the instructions;

incrementing an amount in a speculative counter by said amount in said event counter;

determining if any of the instructions are retirable instructions;

decrementing said amount in said speculative counter and incrementing an amount in a non-speculative counter by said amount in any of said event counters corresponding to retirable instructions; and retiring any retirable instructions.

62. A program storage device readable by a machine, tangibly embodying a program of instructions executable by the machine to perform a method for counting events during the execution of one or more instructions in a computer system, wherein the computer system contains an event counter for each event to be counted for each of the instructions, the method including:

executing one of the instructions;

incrementing an amount in the event counter corresponding to said one of the instructions each time an event corresponding to said event counter occurs during execution of said one of the instructions;

incrementing an amount in a speculative counter by said amount in said event counter;

determining if any of the instructions are retirable instructions;

decrementing said amount in said speculative counter and incrementing an amount in a non-speculative counter by said amount in any of said event counters corresponding to retirable instructions; and retiring any retirable instructions.

* * * * *

UNITED STATES PATENT AND TRADEMARK OFFICE
CERTIFICATE OF CORRECTION

PATENT NO.  : 6,675,372 B1
DATED       : January 6, 2004
INVENTOR(S) : Peter C. Damron

It is certified that error appears in the above-identified patent and that said Letters Patent is hereby corrected as shown below:

<u>Column 3,</u>
Line 26, replace "eventcounter" with -- event counter --.

<u>Column 4,</u>
Line 8, replace "nonspeculative" with -- non-speculative --.

Signed and Sealed this

Fifteenth Day of June, 2004

JON W. DUDAS
*Acting Director of the United States Patent and Trademark Office*